United States Patent Office 3,355,223
Patented Nov. 28, 1967

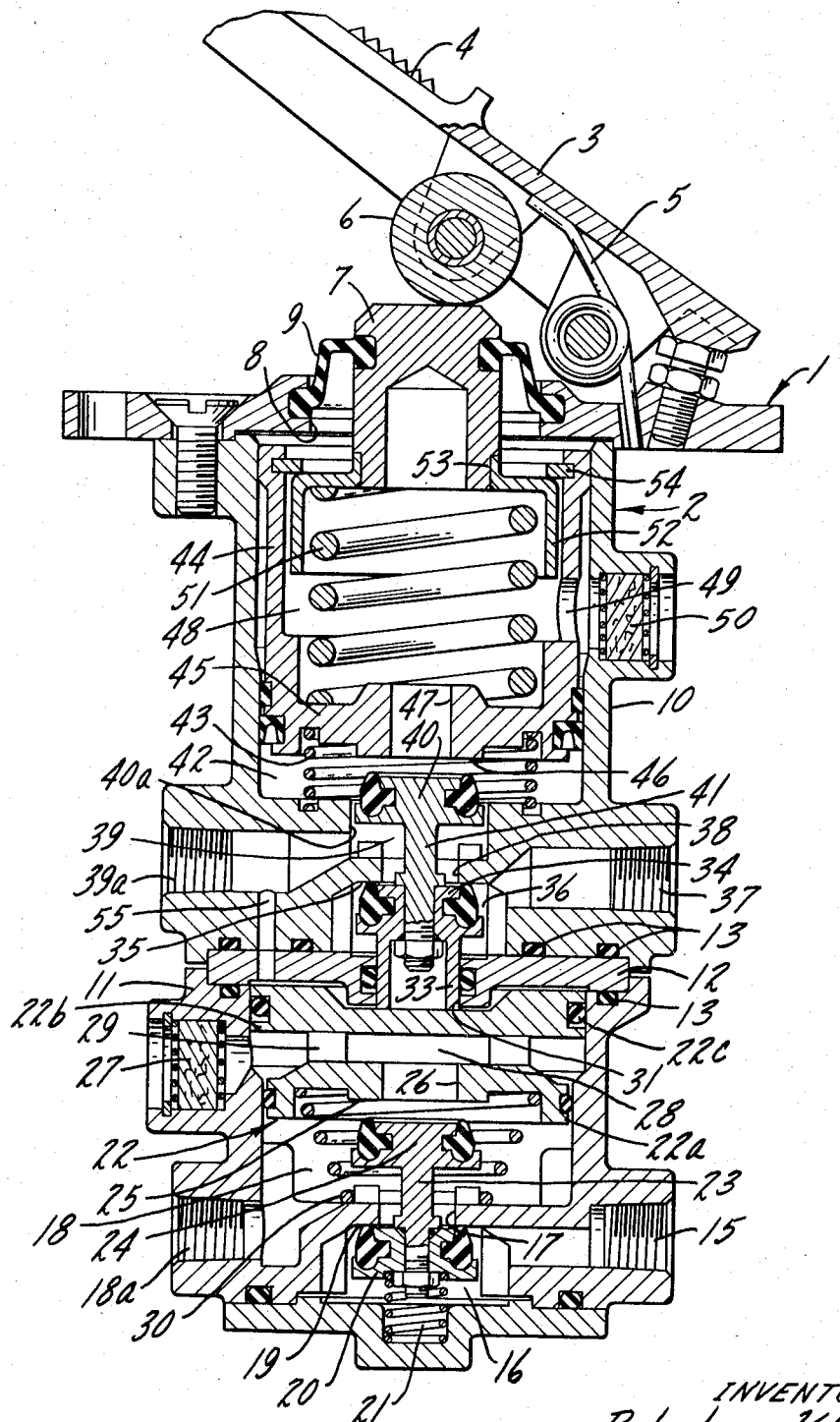

3,355,223
DUAL APPLICATION VALVE
Boleslaw Klimek, Des Plaines, Ill., assignor to Berg Mfg. & Sales Co., Des Plaines, Ill., a corporation of Illinois
Filed July 28, 1966, Ser. No. 568,623
2 Claims. (Cl. 303—52)

ABSTRACT OF THE DISCLOSURE

An application valve assembly for dual brake systems having independent reservoirs and brake-operating cylinders wherein a first valve is movable to communicate a first reservoir with a first brake and a second valve is movable to communicate the second reservoir with a second brake, the valves being in entirely separate chambers of a housing, each of the chambers being sealed from the other at all valve positions and having a piston, one of the pistons being manually operable to close a first exhaust passage for the first brake and open the first valve, there being an extension slidable between the housings and engaging a piston in the second chamber to move it into engagement with the second valve to close a separate exhaust passage for the second brake and to open communication between the second reservoir and the second brake, a permanently opened passage being formed in the housing between the chambers to communicate the first brake with the side of the piston opposite that engaging the second valve.

This invention relates to fluid pressure brake systems and has particular relation to the application of fluid pressure to a vehicle brake system.

One purpose of the invention is to provide a unitary brake pressure application valve effective to apply fluid pressure to dual sets of brakes.

Another purpose is to provide a fluid pressure brake system application valve effective to supply pressure simultaneously to a plurality of sets of brakes.

Another purpose is to provide an application valve having a variable-force operating element.

Another purpose is to provide an application valve insuring application of fluid pressure to at least one brake system of a vehicle having a plurality of brake systems.

Another purpose is to provide a brake system application valve productive of uniform brake application.

Other purposes will appear from time to time during the course of the specification and claims.

The invention is illustrated more or less diagrammatically in the accompanying drawing, wherein:

The figure is a side elevation in cross section.

Referring now to the drawing, the numeral 1 generally designates a base or floor plate. Secured to and extending from one surface of plate 1 is a valve housing generally indicated by the numeral 2. An operating member 3, having a foot-engageable surface 4, is pivoted on the opposite surface of plate 1 and yieldingly urged into the nonoperating position shown in the figure by yielding means 5 engaging plate 1 and member 3. Member 3 carries the operating roller 6 in engagement with the external surface of an operating plug 7 reciprocal in aperture 8 in plate 1. Indicated at 9 is a dust cover engaging plate 1 and plug 7.

The housing 2 includes subhousings 10 and 11 arranged in coaxial alignment and secured together in any suitable manner, clamping adapter plate 12 therebetween. Housing parts 10, 11 carry seals 13 in engagement with the opposite surfaces of plate 12.

A fluid pressure inlet 15 is formed in housing part 11 for communication with a first service chamber 16 therein. A passage 17 communicates chamber 16 with a second service chamber 18 formed in housing part 11. A first service valve seat 19 is formed within chamber 16 about passage 17 and is closed by a first service valve 20 urged into engagement with seat 19 by spring 21 carried in chamber 16. A first service pressure outlet 18a communicates with chamber 18.

An operating piston 22 is reciprocal in chamber 18. Secured to service valve 20, as by stem 23 extending through passage 17, is a first exhaust valve 24. The valve 24 is positioned for engagement with a first exhaust valve seat 25 carried by piston 22 and surrounding an exhaust passage 26 axially positioned in piston 22. The passage 26 communicates with a first exhaust outlet 27 through the space 28 formed by legs 29 which join the two portions 22a and 22b of piston 22. It will be observed that piston portion 22b has a slightly larger diameter than portion 22a and that service chamber 18 is enlarged above exhaust passage 27 for reciprocal reception of enlarged piston portion 22b. A yielding means, such as spring 30, is positioned in chamber 18 to urge piston 22 in a direction away from exhaust valve 24.

Adapter plate 12 has a central aperture 31 grooved to carry seal 32 in engagement with a finger portion 33 extending reciprocally through aperture 31 from a second service valve member 34. The second service valve member 34 is positioned to close against a second service valve seat 35, thus closing a third service chamber 36 with which a second fluid pressure inlet 37 communicates. Passage 38 extends through valve seat 35 for communication of chamber 36 with a fourth service chamber 39. A second fluid pressure outlet 39a communicates chamber 39 with a second set of fluid-pressure-operated brakes (not shown). A second exhaust valve member 40 is secured to valve 34, being connected thereto by valve stem 41 extending through passage 38. Exhaust valve 40, in the position shown in the drawing, extends into an operating chamber 42 with which chamber 39 communicates through the peripheral space 40a about valve 40. Urged, as by spring 43, in a direction away from exhaust valve 40 within chamber 42 is a reciprocal, cup-shaped operating piston 44. Piston 44 has a bottom wall 45, the external surface of which carries a central exhaust valve seating surface or second exhaust valve seat 46 for engagement with exhaust valve 40. An exhaust passage 47 is formed in the wall 45 and extends through valve seat 46 to communicate service chamber 39 about the perimeter of valve 40 and through chamber 42 with the chamber 48 formed in piston 44. The circumferential wall of piston 44 is apertured as at 49 for communication of chamber 48 with a second housing exhaust outlet 50.

An operating yielding means such as the spring 51 is positioned within the elongated chamber 48 formed by and within elongated, cup-shaped piston 44, the spring 51 engaging the inner surface of end wall 45 at one end of said spring. The opposite end of spring 51 engages a retainer cap member 52 which is in turn secured to plug 7, as indicated at 53. A retainer ring 54 is secured to piston 44 and extends into chamber 48 adjacent its open end to serve as a limit abutment for cap 52.

A passage 55 extends through a portion of housing part 10 and plate 12 to communicable the area above piston 22, as the parts are shown in the drawing, with the chamber 39.

The use and operation of the invention are as follows:

It will be understood that fluid pressure, such as air pressure, is present at inlets 15 and 37 and thus in chambers 16 and 36. The operator presses downwardly on pedal 3 to move plug 7, through the mediacy of roller 6, and thus to move retainer 52 against spring 51, the spring 51 providing a "feel" to the operator. Continued downward movement of pedal 3 produces a downward movement of piston 44, closing exhaust passage 47 against exhaust valve 40. Further movement of piston 44 produces a downward movement of the dual valve member 33, 34, 40. Simultaneously with said downward movement of said dual valve member, the piston 22 is moved downwardly to close exhaust passage 26 against exhaust valve 24 and to open service valves 34 and 20. Thus fluid pressure is delivered from inlets 15, 37 respectively through chambers 16, 18 and outlet 18a and chambers 36, 39 and outlet 39a to the brake chambers of the vehicle to apply the dual sets of brakes. The passage 55 is effective to provide a balancing equalization of the fluid pressure above piston 22 and in chamber 39.

The flow patterns of fluid pressure through the device of the invention are maintained entirely distinct and separate. Should leakage occur in the brake system connected with inlet 15 and outlet 18a, for example, the same would have no affect on the operation of fluid pressure provided at inlet 37, and vice versa. The fluid pressure above piston 22 and in chamber 39, equalized through passage 55, is sealed and maintained separate from fluid pressure traveling between inlet 15 and outlet 18a or exhaust outlet 27, by the seal 22c carried by piston 22.

Upon release of pedal member 3 the spring 5 is effective to urge the same to the position shown in the drawing. Thereupon, also, springs 30 and 43 are effective, in conjunction with fluid pressure in the brake systems connected to outlets 18a and 39a and thus present in chamber 18 and 39, to move pistons 22 and 44, respectively, toward the positions shown in the drawing. The pressure above piston 22 passes through passage 55 into chamber 39 and, like the pressure at outlet 39a and in chamber 39, the same flows through the passage 48 about the periphery of valve 40 to enter chamber 42. Upward movement (as the parts are shown) of piston 44 results in opening of exhaust valve 40 and exhaust passage 47 to exhaust the system connected to outlet 39a through the chamber 48 and exhaust outlets 49, 50. Similarly, the pressure in the system secured to outlet 18a and present, therefore, in chamber 18 is effective, in conjunction with spring 30, to move piston 22 toward the position shown in the drawing and thus to open exhaust valve 24 and exhaust passage 26, 28, 27. Upward movement of piston 22 is effective to return inlet valve 34 into closed position to close inlet passage 38 and spring 21 is effective to return inlet valve 20 into closing position to close passage 17.

Thus the preloaded setting of spring 51 provides for a uniform "feel" and uniform transmission of the operator's foot pressure on pedal 3 to both inlet valves 20 and 34 and thus provides the uniform distribution of fluid pressure through the outlets 18a, 39a to the dual set of brake chambers.

Similarly, the passage 55 provides for a balancing of pressures above piston 22 and below piston 44. Thus, should it occur that excessive fluid pressure is present at inlet 37 over that present at inlet 15, said excess pressure will produce an additional downward movement of piston 22, beyond that produced mechanically by the valve portion 33, thus to provide further opening of inlet valve 20. Similarly, excessive pressure in chamber 18 will tend to resist the downward movement of piston 22 after contact thereof with exhaust valve 24, the spring 51 loading being thus increased in response to such resistance.

Thus, also, the involved pressures are modulated through the action of foot pedal 3 in compressing spring 51. As spring 51 is increasingly depressed a greater pressure is required to move piston 45 against the action of spring 51 in order to permit the resetting of valves 34 and 20. Hence a greater pressure is supplied at ports 39a and 18a. Thus the operator is able to modulate and control the pressure levels supplied to the brakes through outlets 39a, 18a and thus to modulate and control the resulting braking action.

What is claimed:

1. A brake pressure application valve including a housing, a first pressure inlet, a first pressure outlet, a first valve controlling communication between said first inlet and first outlet, a second pressure inlet, a second pressure outlet, a second valve controlling communication between said second inlet and second outlet, said first inlet and outlet being sealed against communication with said second inlet and outlet at all positions of said valves, and means for operating said valves including a first piston reciprocal in said housing for operating contact with said first valve, a second piston reciprocal in said housing for operating contact with said second valve, said first valve having a poriton positioned for operating contact with said second piston, said operating contact between said first valve and said second piston being provided by an extension on said first valve, said extension being slidable in said housing and a seal engaging said housing and said extension.

2. The structure of claim 1 characterized by a first yielding member positioned to urge said first piston away from said first valve, a second yielding member positioned to urge said second piston away from said second valve and to urge said first valve toward its closed position through the mediacy of said extension and a third yielding member positioned to urge second valve toward its closed position.

References Cited
UNITED STATES PATENTS
3,011,832  12/1961  Euga _____ 303—52 X
3,207,561  9/1965  Bueler _____ 303—52

FOREIGN PATENTS
823,160  11/1959  Great Britain.

ARTHUR L. LA POINT, *Primary Examiner.*

EUGENE G. BOTZ, *Assistant Examiner.*